United States Patent [19]

Hardison

[11] Patent Number: 4,687,576
[45] Date of Patent: Aug. 18, 1987

[54] CURRENT PROPELLED WASTE WATER TREATMENT MECHANISM

[76] Inventor: John C. Hardison, 2500 W. Skelly, Tulsa, Okla. 74107

[21] Appl. No.: 776,517

[22] Filed: Sep. 16, 1985

[51] Int. Cl.$^4$ ............................................. B01D 21/20
[52] U.S. Cl. .................................... 210/200; 210/219; 210/256; 210/320; 210/530
[58] Field of Search ............... 210/256, 320, 207, 208, 210/219, 197, 523–531, 195.4, 200

[56] References Cited

U.S. PATENT DOCUMENTS

| | | | |
|---|---|---|---|
| 3,495,712 | 2/1970 | Schreiber | 210/256 X |
| 3,533,508 | 10/1970 | Schreiber et al. | 210/256 X |
| 3,595,783 | 7/1971 | Pflanz et al. | 210/256 X |
| 3,649,529 | 3/1972 | Walker | 210/256 X |
| 3,733,263 | 5/1973 | Mandt | 210/256 X |

*Primary Examiner*—Tom Wyse
*Attorney, Agent, or Firm*—Schmidt, Johnson, Hovey & Williams

[57] ABSTRACT

In a sewage treatment system having a series of generally concentric, ring-like treatment tanks, a siphoning head used to withdraw sludge from the bottom of the clarifying tank is propelled slowly and smoothly through its tank by the moving current of sewage in an adjacent tank. Overhead bridge structure supporting the siphoning head in the clarifying tank also overhangs the next adjacent tank and supports a depending baffle which is impinged by the flowing sewage in the adjacent tank. The baffle is positioned closely adjacent the wall between the two tanks such that eddy currents set up in the vicinity of the baffle as the latter is acted upon by the flowing sewage have the effect of entering transfer passages between the two tanks to clean out clogging debris and grease.

7 Claims, 5 Drawing Figures

U.S. Patent   Aug. 18, 1987   Sheet 1 of 2   4,687,576
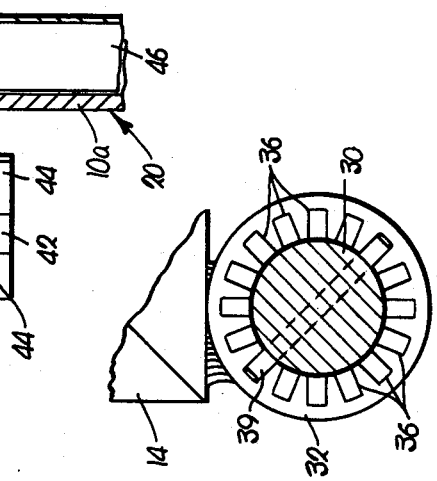
Fig. 4
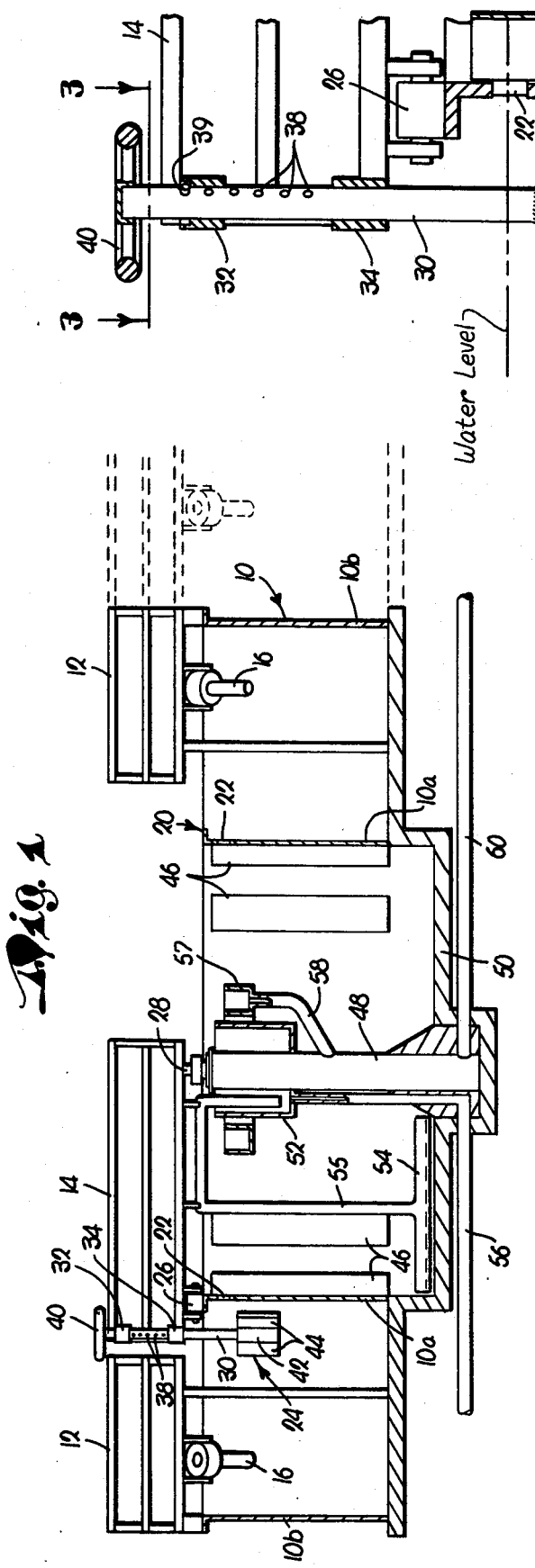
Fig. 1
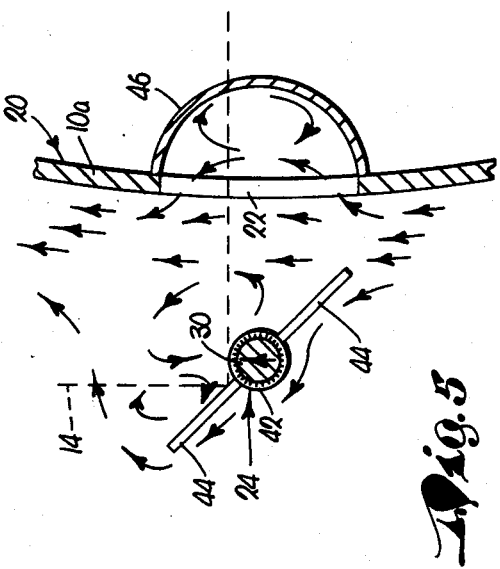
Fig. 3
Fig. 5

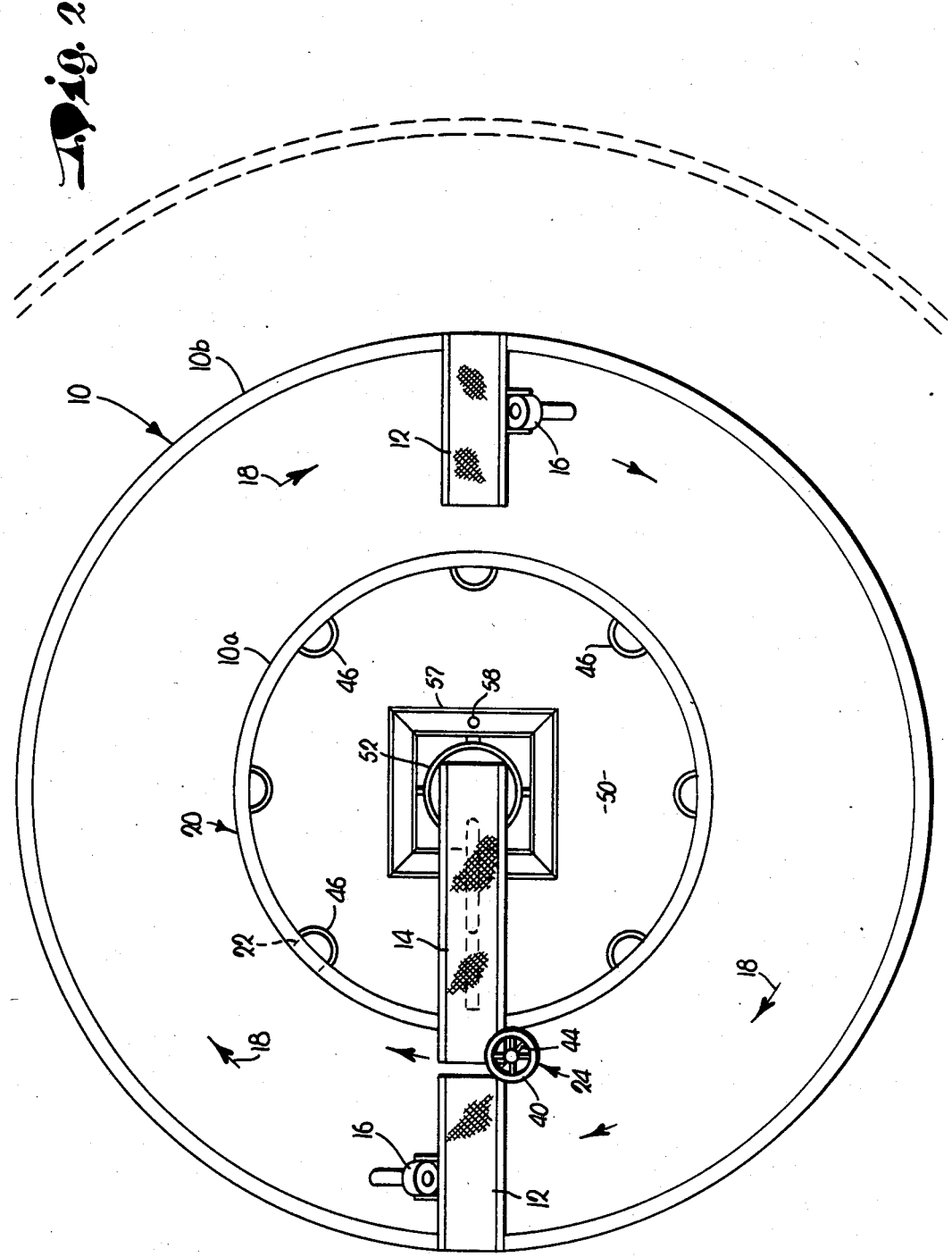

CURRENT PROPELLED WASTE WATER TREATMENT MECHANISM

BACKGROUND OF THE INVENTION

1. Technical Field

This invention relates to sewage treatment plants and, more particularly, to systems for use in such plants which utilize a series of generally concentric channels or tanks through which treated sewage progresses inwardly from tank to tank during digestion, aeration and clarification as the treatment process is carried out.

2. Background Information

As the sewage being treated in systems of the foregoing type is agitated and aerated in outer ring-like tanks of the system in an orbiting or circular flow pattern, it also migrates inwardly through passages in the tank walls toward the center of the system, eventually finding its way to a centermost quiescent zone or clarifying tank in which sludge is allowed to precipitate out onto the bottom of the tank while the clarified effluent is allowed to overflow into discharge weirs. The sludge must be continuously removed from the bottom of the clairfying tank, yet in a way which does not unduly disturb or agitate the contents and interface with clarification. Thus, a common practice is to suspend a sludge siphon header into the tank and move it very gently and slowly along the bottom in an orbiting path of travel. Powered prime movers such as engines and motors, along with gears and associated drive trains have typically been utilized for slowly driving an overhead bridge to which the siphon header is attached in an orbiting path of travel to provide the slow, steady movement of the header. However, such motors and gears are inherently expensive and troublesome, requiring not only a substantial initial capital outlay but also significant expenditures from time-to-time for maintenance and repair.

SUMMARY OF THE PRESENT INVENTION

Accordingly, one important object of the present invention is to eliminate the problems inherent in conventional drive systems of the foregoing type by utilizing instead an orbiting mechanism for the suction header or other device that is driven solely by the current flow of sewage in an adjacent treating tank.

To this end, the present invention contemplates providing a baffle which, while joined with the sludge siphon header for movement therewith in one tank, is positioned to be submerged within the sewage flow in an adjacent tank such that impingement of the adjacent sewage flow against the baffle has the effect of driving the siphon header in its orbital movement within the clarifying tank. Means are provided for varying not only the depth of the baffle but also the angular orientation of the latter relative to the direction of sewage flow in the driving tank such that the speed of orbiting movement of the siphon header can be appropriately adjusted.

It has also been found that inflow passages from an aeration tank into the clarifying tank have a tendency to become clogged with grease and debris in prior systems. However, in connection with the present invention, by passing the driving baffle for the siphon header closely adjacent such passages as the baffle sweeps along the tank wall in its orbiting movement, eddy currents are set up in the vicinity of the baffle which reach into the flow passages and sufficiently agitate the sewage in that area as to dislodge obstructing grease and debris from such passages.

IN THE DRAWINGS;

FIG. 1 is a fragmentary, vertical cross-sectional view through the axis of a current propelled waste water treatment mechanism made in accordance with my present invention;

FIG. 2 is a fragmentary, schematic, plan view of the mechanism shown in FIG. 1;

FIG. 3 is an enlarged, fragmentary cross-sectional view taken on line 3—3 of FIG. 4;

FIG. 4 is a fragmentary elevational view, partially in section showing essentially the baffle assembly and parts proximal thereto; and FIG. 5 is a fragmentary, horizontal cross-sectional view through the baffle, its support and parts proximal thereto.

DESCRIPTION OF THE PREFERRED EMBODIMENT

An outer, open top, annular sewage aeration tank 10 is defined by a pair of concentric, inner and outer walls 10a and 10b and has a pair of diametrically opposed, radial walkways or bridges 12 stationary thereabove. Each bridge 12 supports mechanism, such as pumps 16, for producing jet streams which continuously aerate and advance the sewage in the tank 10 along a circular path of travel circumscribing the axis of the tank 10 as shown by arrows 18 in FIG. 2. An inner, open top, cylindrical sewage settling tank 20 is defined by the wall 10a inwardly thereof and has a series of circumferentially spaced passages 22 adjacent the upper margin of water 10a for flow of sewage into tank 20 from the tank 10.

A rotatable bridge 14, alignable with the bridges 12, extends partially across the tank 20 to the center of the latter and is provided with a supporting roller 26 which rolls along the upper edge of the wall 10a. An upright shaft 28, rotatable about the upright axis of the tank 20, supports the inner end of the bridge 14.

A baffle 24 is suspended from the outer end of the bridge 14 into the tank 20, as best seen in FIG. 4, by an upright, adjustably rotatable, vertically adjustable rod 30 extending through collars 32 and 34 rigid to the bridge 14. The collar 32 has a series of spaced, pin-receiving notches 36 (FIG. 3) in its upper extremity extending radially outwardly from the rod 30, and the rod 30 is provided with a series of vertically spaced, pin-receiving cross holes 38. A removable pin 39 extends through a selected hole 38 and into selected, diametrically opposed notches 36 in the top of the collar 32 to releasably lock the baffle 24 at a selected depth and angular position.

A control wheel 40 is secured to the uppermost end of the rod 30 above the bridges 12 and 14 and a sleeve 42 is rigid to the rod 30 at its lowermost end. The baffle 24 is in the nature of a pair of diametrically opposed vanes 44 rigid to and extending radially outwardly of the sleeve 42.

Sewage from the tank 10 flows into the tank 20 via passages 22 and upright, open bottom, semi-circular, "stilling wells" or inflow guide channels 46 secured to the inner face of wall 10a. As a result of the stilling wells 46, the sewage enters the tank 20 in a quiescent manner near the bottom 50 of the tank, descending by gravity through wells 46.

The shaft 28 is journalled in an upright pipe 48 carried by bottom 50 and a cylindrical, open top sludge draw chamber 52 is mounted on the upper end of the pipe 48 in surrounding relationship thereto. A slotted, sludge siphon header 54 carried by the bridge 14 sweeps along the bottom 50 and discharges into the chamber 52 via a line 55. Sludge is discharged from chamber 52 by a line 56. Effluent weirs 57, surrounding the chamber 52 in a rectangular pattern as viewed in plan (FIG. 2) and carried thereby have a line 58 discharging into the pipe 48, and a line 60 carries the effluent from the pipe 48, which in turn leads to a clarifier tank (not shown).

OPERATION

As the sewage in the tank 10 circulates in an orbiting manner in the direction of the arrows 18, it impinges upon the baffle 24 and thus propells the moveable bridge 14 about the axis of upright shaft 28 in a rotary manner. The speed of rotation of the bridge 14 can be easily adjusted by simply changing the angular orientation of the baffle 24 with respect to the current flow there-against, the more abrupt the angle of attack between the current and the baffle 24 the greater the speed of rotation of the bridge portion 14.

If adjustment is desired, it is but necessary to lift the rod 30 via the wheel 40 sufficiently to disengage the pin 39 from its notch 36, and to then rotate the rod 30 to the desired extent before relowering the same back down to a position wherein the pin 39 becomes received within the newly selected notch 36. Thus, the speed of movement of the siphon header 54 along the bottom 50 may be rather closely controlled and adjusted to fit the circumstances at hand.

It will be appreciated that in view of the fact the sewage flows on past the baffle 24 at a somewhat faster speed, eddy currents are set up on the leading face of the baffle 24 as illustrated in FIG. 5. Such eddy currents are particularly helpful in providing a continuous cleaning action for the passages 22 which tend to become obstructed and clogged with grease and debris. Moreover, even when baffle 24 is moving at substantially the same speed as the current, movement of the baffle 24 past the stationary passages 22 in itself assists in maintaining such passages 22 clear and open.

I claim:

1. A sewage treatment system comprising:
   an inner open top clarifying tank in which sludge settles out of the sewage and an outer open top aeration tank surrounding said inner tank in which the sewage is agitated before entering the clarifying tank;
   a stationary bridge above the aeration tank;
   stationary means mounted on said stationary bridge for causing a horizontally moving current of sewage within said aeration tank;
   a movable bridge above said clarifying tank;
   apparatus supported on said movable bridge and projecting into said clarifying tank for performing a certain operation within said clarifying tank as the apparatus moves with the movable bridge; and
   a baffle depending from said movable bridge and projecting into said aeration tank for impingement of the baffle by the moving current in said aeration tank whereby to drive said apparatus in a prescribed path of travel within the clarifying tank without subjecting the contents of the clarifying tank to the agitation occuring in the aeration tank.

2. In a sewage treatment system as claimed in claim 1, wherein said baffle is provided with means for adjusting the angle of inpingement of the moving current against the same whereby to adjust the speed at which said apparatus is propelled.

3. In a sewage treatment system as claimed in claim 2, wherein said tanks are provided with a wall therebetween, said movable bridge spanning said wall and at least partially overlying both of the tanks.

4. In a sewage treatment system as claimed in claim 3, wherein said means for adjusting the angle of the baffle includes an upright rod fixed to the baffle and rotatably carried by said movable bridge, and releasable retaining means for holding the rod in a selected position of rotated adjustment.

5. In a sewage treatment system as claimed in claim 3, wherein said tanks are mutually concentric, said movable bridge having means adapting the same for pivoting movement about the common central axis of the tanks for propulsion of the apparatus in said prescribed path of travel.

6. In a sewage treatment system as claimed in claim 5, wherein said apparatus comprises a suction device for removing settled sludge from said clarifying tank.

7. In a sewage treatment system as claimed in claim 1, wherein said tanks are provided with a wall therebetween having a passage therethrough for flow of sewage between the tanks, said baffle being disposed for movement in close proximity to said passage as the apparatus is propelled in said prescribed path of travel for maintaining the passage free of obstructing debris.

* * * * *